US012624660B1

(12) United States Patent   (10) Patent No.:   US 12,624,660 B1
Labrecque et al.   (45) Date of Patent:   May 12, 2026

(54) HYBRID AIRCRAFT POWER PLANT WITH VENTILATED EXHAUST DUCT CAVITY

(71) Applicant: PRATT & WHITNEY CANADA CORP., Longueuil (CA)

(72) Inventors: Michel Labrecque, Sainte-Julie (CA); Bruno Chatelois, Boucherville (CA); Eric S. Durocher, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/084,970

(22) Filed: Mar. 20, 2025

(51) Int. Cl.
*F02C 7/18*        (2006.01)
*B64D 27/33*      (2024.01)
*F01D 15/10*      (2006.01)
*F01D 25/30*      (2006.01)
*F02C 6/00*        (2006.01)

(52) U.S. Cl.
CPC ............... *F02C 7/18* (2013.01); *B64D 27/33* (2024.01); *F01D 15/10* (2013.01); *F01D 25/30* (2013.01); *F02C 6/00* (2013.01); *F05D 2220/76* (2013.01); *F05D 2260/232* (2013.01)

(58) Field of Classification Search
CPC ......... B64D 27/33; F01D 15/10; F01D 25/30; F02C 7/18; F02C 7/32; F05D 2260/608; F05D 2220/76
See application file for complete search history.

(56) References Cited

U.S. PATENT DOCUMENTS

| | | | | |
|---|---|---|---|---|
| 7,493,769 B2 * | 2/2009 | Jangili | ...................... | F02C 7/18 415/180 |
| 9,003,811 B2 * | 4/2015 | Barnett | ...................... | F02C 7/32 248/554 |
| 10,801,410 B2 * | 10/2020 | Roberge | .................. | F01D 9/065 |
| 11,078,843 B2 * | 8/2021 | Roberge | .................. | F02C 6/06 |
| 11,156,128 B2 * | 10/2021 | Miller | .................... | B64D 27/33 |
| 11,377,978 B2 | 7/2022 | Beaujard et al. | | |
| 11,384,693 B2 * | 7/2022 | Lefebvre | .................. | F02C 7/32 |
| 11,578,621 B2 * | 2/2023 | Yerram | .................... | F01D 9/06 |
| 11,686,253 B2 * | 6/2023 | Lefebvre | .................. | F02K 5/00 60/802 |
| 11,702,986 B2 * | 7/2023 | Roberge | .................. | F01D 9/065 477/30 |

(Continued)

FOREIGN PATENT DOCUMENTS

| | | | | | |
|---|---|---|---|---|---|
| FR | | 3132730 A1 * | 8/2023 | ............... | F02C 7/32 |
| FR | | 3142222 A1 | 5/2024 | | |
| WO | WO-2023152108 A1 * | | 8/2023 | ............... | F02C 7/32 |

*Primary Examiner* — Alain Chau
(74) *Attorney, Agent, or Firm* — Norton Rose Fulbright Canada LLP

(57)        ABSTRACT
A hybrid aircraft power plant includes an air mover for propelling an aircraft, a gas turbine engine operable to drive the air mover, and an electric machine operable as a motor to drive the air mover. The gas turbine engine includes a turbine disk for extracting energy from a stream of combustion gas and an exhaust duct defining: an exhaust passage for conveying the stream of combustion gas from the turbine disk; and a cavity disposed radially inward of the exhaust passage. A shaft drivingly connects the turbine disk with the electric machine and extends inside the cavity defined by the exhaust duct. A fan is drivingly connected to the shaft and operable to circulate cooling air inside the cavity of the exhaust duct.

17 Claims, 6 Drawing Sheets

(56)                    References Cited

U.S. PATENT DOCUMENTS

| | | | | |
|---|---|---|---|---|
| 12,025,023 | B2 * | 7/2024 | Yerram | F01D 25/12 |
| 12,246,844 | B1 | 3/2025 | Weaver et al. | |
| 2007/0089421 | A1 * | 4/2007 | Jangili | F01D 25/16 |
| | | | | 60/772 |
| 2019/0316486 | A1 * | 10/2019 | Roberge | F02C 7/18 |
| 2020/0063606 | A1 * | 2/2020 | Miller | F02K 5/00 |
| 2021/0222623 | A1 * | 7/2021 | Roberge | F01D 9/065 |
| 2021/0317784 | A1 * | 10/2021 | Yerram | F01D 9/06 |
| 2021/0355881 | A1 * | 11/2021 | Lefebvre | F02K 5/00 |
| 2022/0128004 | A1 * | 4/2022 | Muldoon | F02C 7/32 |
| 2022/0275761 | A1 * | 9/2022 | Lefebvre | F02C 7/36 |
| 2024/0055948 | A1 * | 2/2024 | Shanmukha | F01D 15/10 |

* cited by examiner

FORWARD ←→ AFT

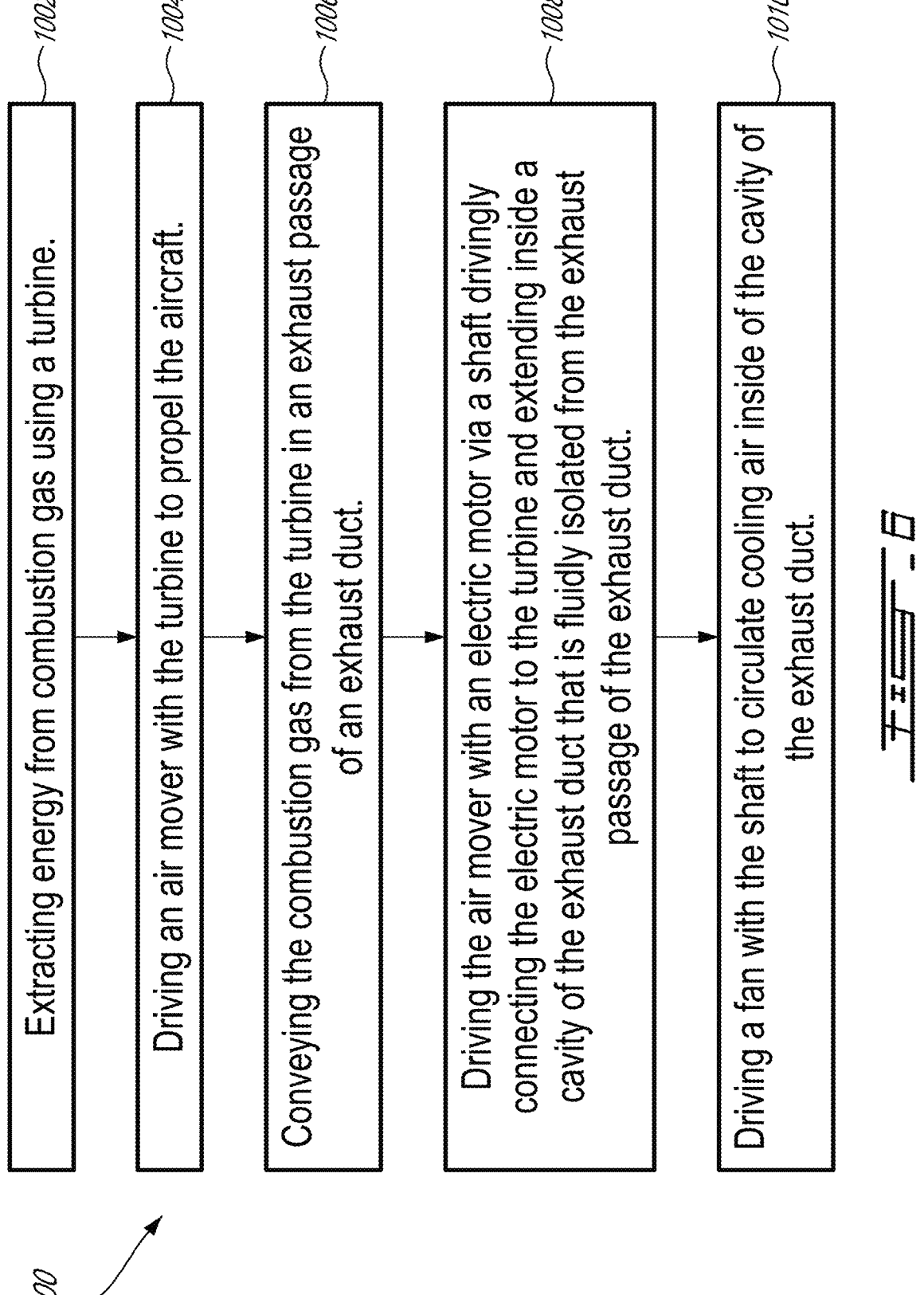

1000

1002 — Extracting energy from combustion gas using a turbine.

1004 — Driving an air mover with the turbine to propel the aircraft.

1006 — Conveying the combustion gas from the turbine in an exhaust passage of an exhaust duct.

1008 — Driving the air mover with an electric motor via a shaft drivingly connecting the electric motor to the turbine and extending inside a cavity of the exhaust duct that is fluidly isolated from the exhaust passage of the exhaust duct.

1010 — Driving a fan with the shaft to circulate cooling air inside of the cavity of the exhaust duct.

FIG. 6

HYBRID AIRCRAFT POWER PLANT WITH VENTILATED EXHAUST DUCT CAVITY

TECHNICAL FIELD

The disclosure relates generally to hybrid aircraft power plants, and more particularly to architectures of hybrid aircraft power plants.

BACKGROUND

A hybrid aircraft power plant that includes a heat engine and an electric motor for propelling an aircraft can provide operational advantages. However, the implementation of hybrid aircraft power plants can be challenging and can result in system architectures that are complex and bulky. Improvement is desirable.

SUMMARY

In one aspect, the disclosure describes a hybrid aircraft power plant comprising: an air mover for propelling an aircraft; a gas turbine engine operable to drive the air mover. The gas turbine engine includes:

a turbine disk operable to extract energy from an annular stream of combustion gas, the turbine disk being rotatable about a rotation axis;

an exhaust duct defining: an exhaust passage disposed radially outward of the rotation axis for receiving the annular stream of the combustion gas from the turbine disk and conveying the combustion gas away from the turbine disk; and a cavity disposed radially inward of the exhaust passage;

a shaft drivingly connected to the turbine disk and extending inside the cavity defined by the exhaust duct; and a fan drivingly connected to the shaft and operable to circulate cooling air inside the cavity defined by the exhaust duct; and an electric machine drivingly connected to the turbine disk via the shaft and operable as a motor to drive the air mover via the shaft.

A rotor of the electric machine may be coaxial with the turbine disk. The shaft may be coaxial with the turbine disk. The turbine disk may be disposed between the electric machine and the air mover.

The fan may be disposed inside of the cavity defined by the exhaust duct and between the electric machine and the turbine disk.

The fan may include a bladed rotor that is mounted for common rotation with the shaft.

The fan may be closer to the electric machine than to the turbine disk.

The blades of the bladed rotor may be oriented to propel the cooling air axially toward the turbine disk.

The hybrid aircraft power plant may include a stator vane fixedly mounted to the exhaust duct inside of the cavity defined by the exhaust duct, for interacting with a flow of the cooling air upstream of the bladed rotor of the fan.

The electric machine may be mounted to the exhaust duct. The electric machine may be disposed outside of the cavity defined by the exhaust duct.

The fan may include a bladed rotor that is mounted for common rotation with the shaft.

The exhaust duct may define an opening providing fluid communication between the cavity defined by the exhaust duct and a source of the cooling air.

The gas turbine engine may be housed inside a nacelle. The source of cooling air may include a space between the nacelle and the gas turbine engine.

The gas turbine engine may be housed inside a nacelle. The source of cooling air may include an ambient environment outside of the nacelle.

The gas turbine engine may include a compressor. The source of cooling air may include the compressor of the gas turbine engine.

The hybrid aircraft power plant may include an inlet scroll operable to deliver the cooling air to the fan.

Embodiments may include combinations of the above features.

In another aspect, the disclosure describes a hybrid aircraft power plant comprising:

a propeller for propelling the aircraft;

a compressor for pressurizing air;

a combustor in which the pressurised air is mixed with fuel and ignited for generating combustion gas;

a turbine disk for extracting energy from combustion gas, the turbine disk having a rotation axis and being in torque-transmitting engagement with the propeller;

an exhaust duct for receiving the combustion gas from the turbine disk, the exhaust duct defining: an exhaust passage disposed radially outward of the rotation axis of the turbine disk for receiving the combustion gas from the turbine disk and conveying the combustion gas away from the turbine disk; and a cavity fluidly isolated from the exhaust passage and disposed radially inward of the exhaust passage;

an electric machine in torque-transmitting engagement with the turbine disk via a shaft extending inside the cavity defined by the exhaust duct; and a fan operable to ventilate the cavity defined by the exhaust duct, the fan including a bladed rotor mounted for common rotation with the shaft.

The propeller may be operable to propel the aircraft in a forward direction. The exhaust duct may be disposed aft of the turbine disk. The electric machine may be disposed aft of the cavity defined by the exhaust duct.

The electric machine may be coaxial with the turbine disk. The shaft may be coaxial with the turbine disk. The turbine disk may be disposed between the electric machine and the propeller. The bladed rotor of the fan may be disposed between the electric machine and the turbine disk.

Embodiments may include combinations of the above features.

In a further aspect, the disclosure describes a method of propelling an aircraft. The method comprises: extracting energy from combustion gas using a turbine; driving an air mover with the turbine to propel the aircraft; conveying the combustion gas from the turbine in an exhaust passage of an exhaust duct; driving the air mover with an electric motor via a shaft drivingly connecting the electric motor to the turbine, the shaft extending inside a cavity of the exhaust duct that is fluidly isolated from the exhaust passage of the exhaust duct; and driving a fan with the shaft to circulate cooling air inside of the cavity of the exhaust duct.

Driving the fan may include rotating a bladed rotor of the fan together and coaxially with the shaft.

Driving the air mover with the turbine to propel the aircraft may include propelling the aircraft in a forward direction. Driving the fan may include propelling the cooling air in the forward direction inside of the cavity of the exhaust duct.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 6 is a flow diagram of a method of propelling an aircraft.

DETAILED DESCRIPTION

The present disclosure relates to architectures of hybrid aircraft power plants and associated methods of propelling aircraft with hybrid aircraft power plants. In some embodiments, the system architectures described herein may facilitate the adaptation of existing gas turbine engine configurations into hybrid power plants. In some embodiments, the system architectures described herein may facilitate the integration of a turboprop gas turbine engine into a hybrid aircraft power plant. For example, a gas turbine engine may be fitted with an exhaust duct that accommodates the installation of an electric motor in proximity with the exhaust duct and configured to assist with the propulsion of the aircraft. In some embodiments, the hybrid aircraft power plant described herein may have a relatively compact architecture with efficient packaging that does not significantly impact the configuration of the gas turbine engine or the size of a nacelle that encloses the hybrid power plant. To protect the electric motor and its associated components from exposure to elevated temperatures from the exhaust duct, hybrid aircraft power plants described herein may include a fan that is operable to ventilate a region near the electric motor.

Aspects of various embodiments are described through reference to the drawings. The term "connected" may include both direct connection (in which two elements contact each other) and indirect connection (in which at least one additional element is located between the two elements). The term "substantially" as used herein may be applied to modify any quantitative representation which could permissibly vary without resulting in a change in the basic function to which it is related.

Figure 1:
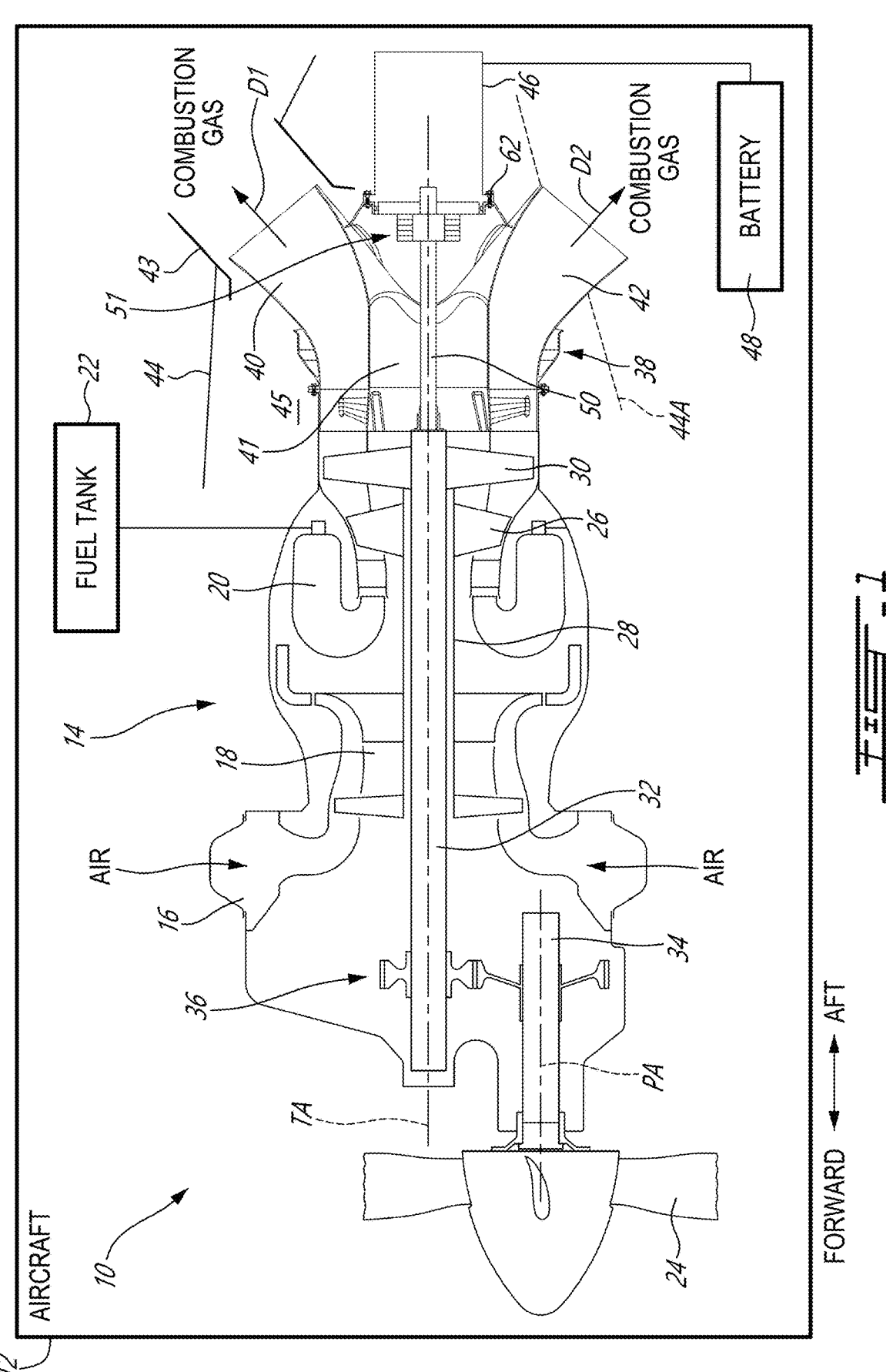
FIG. 1 is an axial cross-sectional view of an exemplary hybrid aircraft power plant including a gas turbine engine and an electric machine as described herein.

FIG. 1 is a schematic axial cross-sectional view of hybrid aircraft power plant 10 (referred hereinafter as "power plant 10") as described herein. Power plant 10 may be used to propel aircraft 12 during one or more phases of flight of aircraft 12. In some embodiments, aircraft 12 may be a fixed wing aircraft. In various embodiments, aircraft 12 may include one or more power plants 10 for propelling aircraft 12. In some embodiments, power plant 10 may be configured for use on rotary wing aircraft (e.g., helicopter). As illustrated in FIG. 1, power plant 10 may include a turboprop gas turbine engine 14 (referred hereinafter as "engine 14") however, aspects of the present disclosure may be incorporated into turboshaft gas turbine engines as well. The forward direction shown in FIG. 1 corresponds to the usual direction of motion of power plant 10 and of aircraft 12 when power plant 10 is propelling aircraft 12 during flight for example. The aft direction shown is opposite to the forward direction.

Engine 14 may be of a type preferably provided for use in subsonic flight. Engine 14 may be a flow-through gas turbine engine where the flow of air and combustion gas through engine 14 is generally toward the aft direction (i.e., from a forward portion of engine 14 to an aft portion of engine 14). For example, engine 14 may include (e.g., radial) air inlet 16 into which ambient air is received and conveyed toward compressor 18. In some embodiments, compressor 18 may be a multistage compressor that pressurized the air received via air inlet 16. Engine 14 may include combustor 20 in which the compressed air received from compressor 18 is mixed with a combustible fuel from fuel tank 22 and ignited to generate an annular stream of hot combustion gas. Engine 14 may include a turbine section to extract energy from the combustion gas and convert the energy into motive power to drive an air mover such as propeller 24 and thereby propel aircraft 12. In various embodiments, power plant 10 may include one or more air movers suitable for propelling aircraft 12. In some embodiments, such air mover(s) may include a bladed rotor such as a fan or a variable-pitch propeller for example.

In various embodiments, engine 14 may be a single spool gas turbine engine or a multi-spool gas turbine engine. In a dual-spool embodiment, engine 14 may include a high-pressure spool including one or more high-pressure turbine disks 26 (referred hereinafter in the singular as "HP turbine disk 26") of the turbine section, high-pressure shaft 28 and one or more stages of compressor 18. HP turbine disk 26 may drive the rotation of the high-pressure spool. Engine 14 may include a low-pressure spool that is separately rotatable from the high-pressure spool. In other words, the high-pressure spool and the low-pressure spool may be mechanically disconnected to permit one spool to freely rotate relative to the other. The low-pressure spool may include one or more low-pressure turbine disks 30 (referred hereinafter in the singular as "LP turbine disk 30"), low-pressure shaft 32 and optionally one or more stages of compressor 18. In some embodiments, high-pressure shaft 28 and low-pressure shaft 32 may be coaxial where high-pressure shaft 28 may be hollow to permit the passage of low-pressure shaft 32 therethrough. LP turbine disk 30 may be disposed downstream of HP turbine disk 26 relative to the gas path conveying combustion gas from combustor 20.

LP turbine disk 30 may drive the rotation of the low-pressure spool and may also drive the rotation of propeller 24. LP turbine disk 30 may be in torque-transmitting engagement with propeller 24 via low-pressure shaft 32. LP turbine disk 30 and low-pressure shaft 32 may be rotatable about turbine axis TA. In some embodiments, propeller 24 may be supported by propeller shaft 34, which may be in torque-transmitting engagement with low-pressure shaft 32 via gear train 36. Propeller shaft 34 and propeller 24 may be rotatable about propeller axis PA, which may be parallel to and offset from turbine axis TA. In other embodiments, propeller 24 and LP turbine disk 30 may be coaxial. In some embodiments, gear train 36 may be of a speed-reducing type so that the rotational speed of propeller shaft 34 may be lower than the rotational speed of low-pressure shaft 32 and of LP turbine disk 30 during operation of power plant 10. Gear train 36 may be part of a speed-reducing gear box also known as a reduction gear box (RGB).

Power plant 10 may include (e.g., bifurcated) exhaust duct 38 (referred herein after as "exhaust duct 38") mounted aft of and downstream of LP turbine disk 30. During operation of engine 14, exhaust duct 38 may receive the annular stream of combustion gas from LP turbine disk 30 and convey the combustion gas away from LP turbine disk 30 via one or more exhaust passages. In some embodiments, exhaust duct 38 may split the annular stream into two (or more) separate streams and then convey the two separate streams of combustion gas in two different general directions of flow referred herein as directions D1, D2. Directions D1 and D2 may be different (e.g., divergent, non-parallel). Directions D1 and D2 may be orientated radially outwardly from turbine axis TA. For example, directions D1 and D2 may have radially outward and aft vector components. In some embodiments, directions D1 and D2 may each be oriented at an acute angle from turbine axis TA. In some embodiments, directions D1 and D2 may each be oriented at an angle of between 30° and 60° from turbine axis TA. In some embodiments, directions D1 and D2 may each be oriented at an angle of between 40° and 50° from turbine axis TA. In some embodiments, directions° D1 and D2 may each be oriented at an angle of about 45° from turbine axis TA. In some embodiments, exhaust duct 38 may include first branch 40 defining a first exhaust passage that conveys a first portion of the combustion gas toward first direction D1 away from (e.g., aft of) LP turbine disk 30 and optionally away from turbine axis TA, and second branch 42 defining a second exhaust passage that conveys a second portion of the combustion gas toward second direction D2 away from (e.g., aft of) LP turbine disk 30 and optionally away from turbine axis TA.

The exhaust passages defined by first branch 40 and second branch 42 may be disposed radially outward of turbine axis TA. In some embodiments, the exhaust passages defined by first branch 40 and second branch 42 may be disposed diametrically opposite from each other relative to turbine axis TA. Exhaust duct 38 may define an inner (e.g., central) cavity 41 disposed radially inward of the exhaust passage(s) and axially overlapping with the exhaust passage(s). Cavity 41 may be fluidly isolated from the exhaust passage(s) by one or more walls of exhaust duct 38 so that no substantial amount of combustion gas may flow through cavity 41.

In some embodiments, additional duct work such as respective ejector pipes 43 (only one being shown as an example) may be in fluid communication with first branch 40 and second branch 42 of exhaust duct 38 to optionally ventilate space 45 inside of nacelle 44 and also convey the combustion gas outside of nacelle 44. Nacelle 44 is partially shown in FIG. 1 and may envelope part of power plant 10. For example, in some embodiments, engine 14, exhaust duct 38 and electric machine 46 may be housed in nacelle 44.

Alternatively, first branch 40 and second branch 42 may convey the combustion gas directly outside of nacelle 44 without the use of ejector pipes 43. As an example, FIG. 1 shows alternate nacelle 44A in broken lines where first branch 40 and second branch 42 may convey the combustion gas directly outside of alternate nacelle 44A without the use of ejector pipes 43. Alternate nacelle 44A is partially shown in FIG. 1 and may envelope part of power plant 10. For example, in some embodiments, engine 14, some or all of exhaust duct 38, and electric machine 46 may be housed in alternate nacelle 44A.

In some embodiments, electric machine 46 may be mounted to and supported by exhaust duct 38. Electric machine 46 may be disposed outside (e.g., aft) of cavity 41 defined by exhaust duct 38. Electric machine 46 may be disposed aft of LP turbine disk 30. LP turbine disk 30 may be disposed between electric machine 46 and propeller 24. Electric machine 46 may be drivingly connected to propeller 24 via LP turbine disk 30 and low-pressure shaft 32. In some embodiments, electric machine 46 may be operable as an electric motor for converting electric energy into torque for driving propeller 24. Alternatively or in addition, electric machine 46 may be operable as an electric generator where mechanical energy (e.g., torque*rotational speed) is converted into electric energy. During a motoring mode of operation, electric machine 46 may receive electric energy from a suitable electric power source such as (e.g., rechargeable) battery 48. During a generating mode of operation, electric machine 46 may receive mechanical energy from LP turbine disk 30 and generate electric energy for charging battery 48 or powering one or more other electric loads of power plant 10 or of aircraft 12.

In various embodiments, engine 14 and electric machine 46 may be controlled by one or more controllers so that engine 14 and electric machine 46 may be operated either together or separately to drive propeller 24. In some embodiments, the operation of engine 14 and/or electric machine 46 may be selected based on a phase of flight of aircraft 12. For example, during a take-off phase of a fixed-wing aircraft, both engine 14 and electric machine 46 may be used to cooperatively drive propeller 24. On the other hand, in a leveled cruise phase of flight, only engine 14 may be used to drive propeller 24 in some embodiments.

Electric machine 46 may be operable to drive (i.e., in torque-transmitting engagement with) propeller 24 via low-pressure shaft 32 and/or via separate torque-transmitting engagement between electric machine 46 and propeller 24. In some embodiments, electric machine 46 may be selectively or permanently drivingly connected to low-pressure shaft 32 via coupling shaft 50. Coupling shaft 50 may be connected to low-pressure shaft 32 and to electric machine 46 via suitable splined connections or other means to establish torque transmission between low-pressure shaft 32 and electric machine 46. Coupling shaft 50 may be partially or entirely disposed inside of cavity 41 defined by exhaust duct 38.

In some embodiments, electric machine 46 may be mounted to exhaust duct 38 at a mounting location between first branch 40 and second branch 42 and outside of the exhaust passages. For example, first branch 40 and second branch 42 may extend to opposite sides of electric machine 46. In some embodiments, electric machine 46 may be mounted to be substantially coaxial with LP turbine disk 30 and with low-pressure shaft 32. In some embodiments, coupling shaft 50 may be rotatable about turbine axis TA and consequently be substantially coaxial with LP turbine disk 30, with electric machine 46 and with low-pressure shaft 32.

In some embodiments, (e.g., bifurcated) exhaust duct 38 and the mounting arrangement of electric machine 46 to exhaust duct 38 may be configured as described in U.S. Pat. No. 12,246,844 titled "HYBRID AIRCRAFT POWER PLANT", which is incorporated herein by reference.

Alternatively, power plant 10 may instead include an exhaust duct and mounting arrangement of the electric machine as described in U.S. patent application Ser. No.

18/582,136 filed 20 Feb. 2024 and titled "EXHAUST DUCT MOUNTING STRUCTURE FOR HYBRID AIRCRAFT POWERPLANT", which is incorporated herein by reference. In various embodiments, exhaust duct 38 may include one or more exhaust passages. In various embodiments, electric machine 46 may be mounted directly to exhaust duct 38 or may be mounted to a casing of engine 14 via a suitable intermediate structure (e.g., framework).

In some embodiments, electric machine 46 may be disposed relatively close to the stream(s) of combustion gas conveyed by exhaust duct 38 to promote efficient packaging of power plant 10, and heat from the combustion gas may get transferred toward electric machine 46. In order to protect electric machine 46 and its associated components from potential exposure to excessively high temperatures, power plant 10 may include one or more fans 51 (referred hereinafter in the singular) operable to circulate cooling air inside cavity 41. In some embodiments, fan 51 may be disposed inside of cavity 41 and ventilate cavity 41 as explained below. Fan 51 may be disposed between electric machine 46 and LP turbine disk 30.

Figure 2:
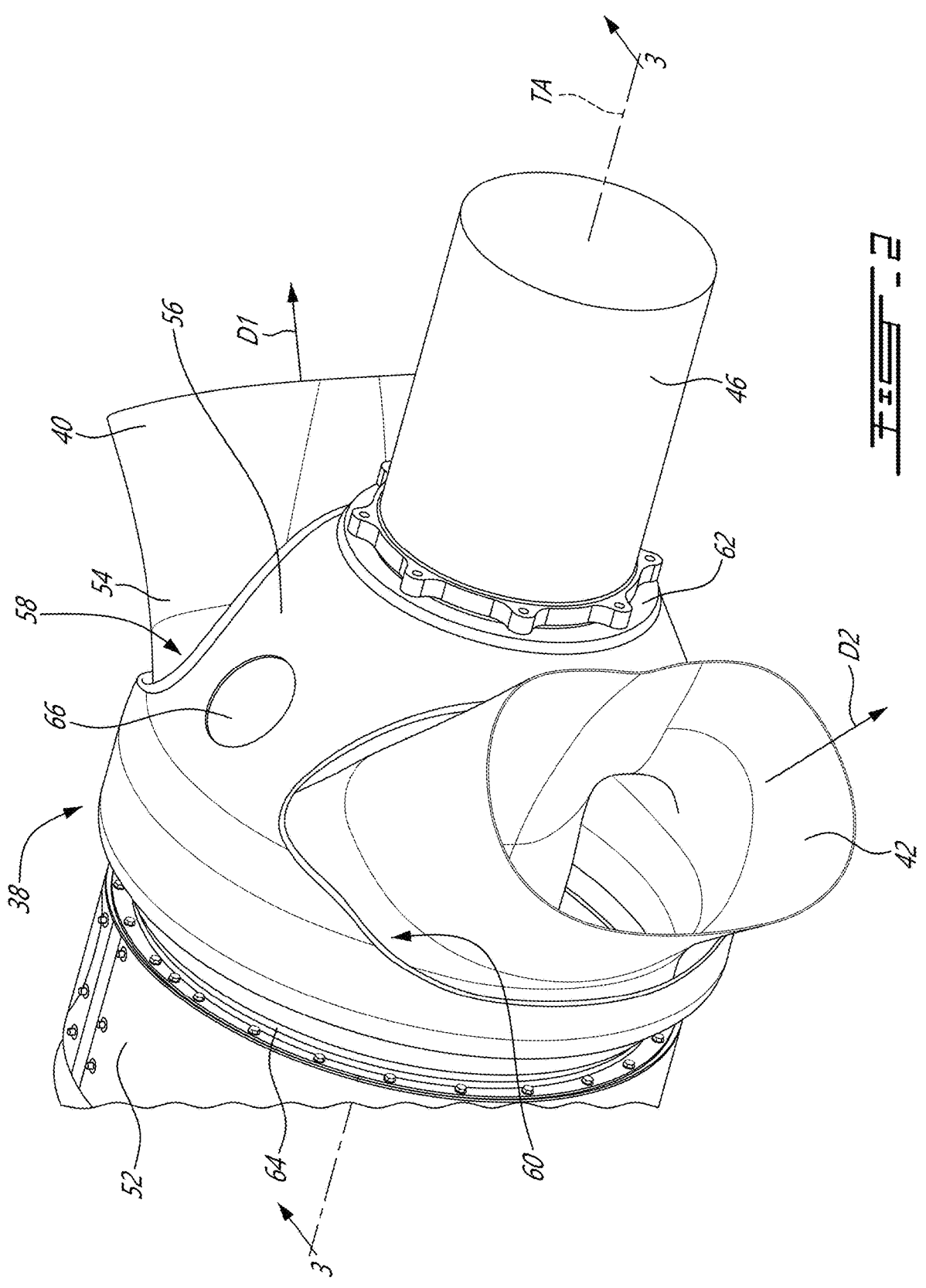
FIG. 2 is a perspective view of an aft portion of the hybrid aircraft power plant of FIG. 1 showing an exemplary exhaust duct and the electric machine mounted to the exhaust duct.

FIG. 2 is a perspective view of an exemplary aft portion of power plant 10 showing exhaust duct 38 and electric machine 46 mounted to exhaust duct 38. Exhaust duct 38 may be connected (e.g., fastened) to casing 52. In various embodiments, exhaust duct 38 may have a single-walled or a double-walled construction. In an exemplary double-walled embodiment, exhaust duct 38 may include inner wall 54 and outer wall 56. Inner wall 54 may interface directly with the combustion gas and cause the annular stream of combustion gas received from LP turbine disk 30 to be split and conveyed into first branch 40 and second branch 42. Accordingly, inner wall 54 may define first branch 40 and second branch 42.

Outer wall 56 may be dispose over (e.g., radially outwardly of) inner wall 54 and thereby cover part of inner wall 54. In some embodiments, first branch 40 and second branch 42 may extend through outer wall 56. For example, outer wall 56 may include first opening 58 extending therethrough and permitting first branch 40 to pass through outer wall 56 and extend from an interior of outer wall 56 to an exterior of outer wall 56. Outer wall 56 may also include second opening 60 extending therethrough and permitting second branch 42 to pass through outer wall 56 and extend from an interior of outer wall 56 to an exterior of outer wall 56.

Electric machine 46 may be mounted (e.g., fastened) to outer wall 56 of exhaust duct 38 at mount 62. Mount 62 may be a mounting pad or other suitable surface(s) providing an interface for securing (e.g., fastening) electric machine 46 to outer wall 56. Outer wall 56 may extend between first branch 40 and second branch 42. Mount 62 may be defined between first branch 40 and second branch 42. Inner wall 54 and outer wall 56 of exhaust duct 38 may each be connected (e.g., welded) to ring 64. Ring 64 may be an annular member serving as a base of exhaust duct 38 that may be fastened to casing 52 of engine 14. Accordingly, elements of exhaust duct 38 may be assembled together to define a single component.

Exhaust duct 38 may be fabricated from a suitable metallic material using known or other sheet metal forming and joining processes. For examples, exhaust duct 38 may be fabricated from a plurality of separate pieces of sheet metal that are formed to a desired shape and subsequently joined together to define the overall shape of exhaust duct 38. In various embodiments, the separate pieces of sheet metal may be welded together or fastened together with rivets for example. In some embodiments, exhaust duct 38 may be fabricated from stainless steel or a suitable nickel-based alloy for example.

In some embodiments, exhaust duct 38 may define one or more openings 66 formed therethrough that provide fluid communication between cavity 41 and a source of cooling air. Opening(s) 66 may extend through inner wall 54 and through outer wall 56 of exhaust duct 38. During operation of fan 51, the cooling air may be drawn into cavity 41 and also expelled out of cavity 41 to ventilate cavity 41 and thereby cause heat to be expelled out of cavity 41. In some embodiments, the source of cooling air may include space 45 between nacelle 44 and engine 14.

Figure 3:
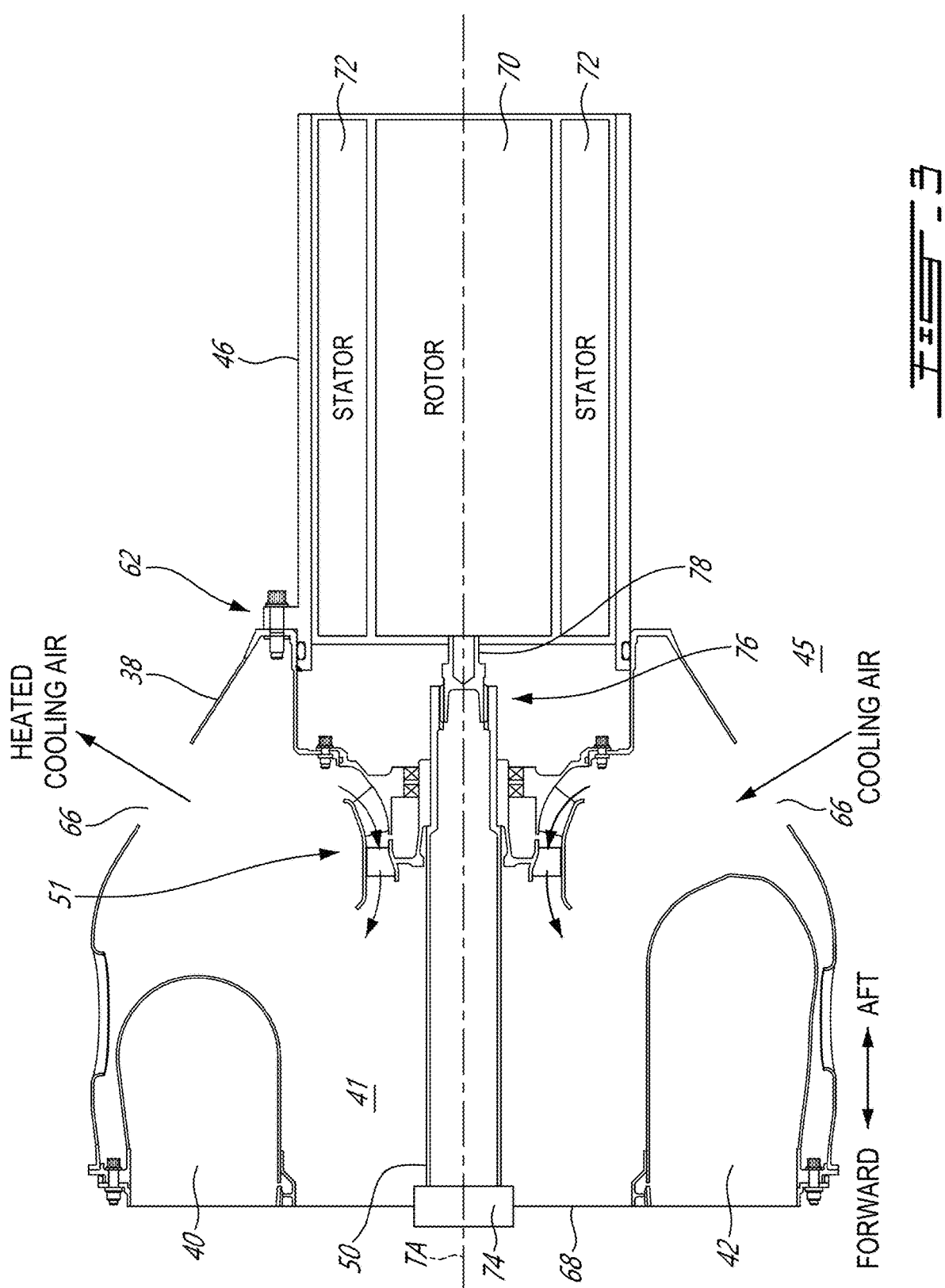
FIG. 3 is a cross-sectional view of the aft portion of the hybrid aircraft power plant of FIG. 2 taken along line 3-3 in FIG. 2 showing an exemplary fan for ventilating a cavity of the exhaust duct with cooling air.

FIG. 3 is cross-sectional view of the aft portion of power plant 10 along line 3-3 in FIG. 2 showing exemplary fan 51 for ventilating cavity 41 of exhaust duct 38. Exhaust duct 38 may define one or more exhaust passages (e.g., defined by first branch 40 and second branch 42) disposed radially outward of turbine axis TA for receiving the annular stream of the combustion gas from LP turbine disk 30 and conveying the combustion gas away from LP turbine disk 30. Exhaust duct 38 may also define (e.g., central) cavity 41 disposed radially inward of the exhaust passage(s). A forward end of cavity 41 may be delimited by forward wall 68. Forward wall 68 may define a (e.g., sealed) barrier between cavity 41 and LP turbine disk 30. An aft end of cavity 41 may be delimited by a wall of exhaust duct 38.

Coupling shaft 50 may extend inside cavity 41 and drivingly interconnect low-pressure shaft 32 with rotor 70 of electric machine 46, which may also include a cooperating stator 72. Alternatively, low-pressure shaft 32 may extend into cavity 41 and be drivingly connected to rotor 70 without the intermediate coupling shaft 50 (e.g., directly). In some embodiments, coupling shaft 50 may be drivingly connected to LP turbine disk 30 via forward coupling 74 establishing a suitable torque-transmitting engagement between a forward end of coupling shaft 50 and an aft end of low-pressure shaft 32. For example, forward coupling 74 may define a splined connection, a keyed connection and/or a flanged connection between low-pressure shaft 32 and coupling shaft 50. Coupling shaft 50 may extend partially or completely through cavity 41. Coupling shaft 50 may be drivingly connected to rotor 70 of electric machine 46 via aft coupling 76 establishing a suitable torque-transmitting engagement between coupling shaft 50 and rotor 70. For example, aft coupling 76 may define a splined connection, a keyed connection and/or a flanged connection between an aft end of coupling shaft 50 and an input/output shaft 78 of electric machine 46.

Fan 51 may be drivingly connected to low-pressure shaft 32 (e.g., via coupling shaft 50) and operable to circulate cooling air inside cavity 41 defined by exhaust duct 38. The operation of fan 51 may cause cooling air to be drawn into cavity 41 via opening(s) 66. While inside of cavity 41, the cooling air may collect heat transferred from the combustion gas that is conducted through the wall(s) of exhaust duct 38. The operation of fan 51 may also cause cooling air to be expelled from cavity 41 via the same or another opening 66. The heated cooling air that is exiting cavity 41 may carry heat out of cavity 41. The flow of cooling air through cavity 41 may cool cavity and thereby cool the environment around electric machine 46. In other words, the cooling air may cool a space between electric machine 46 and the exhaust passage(s) defined by exhaust duct 38.

As illustrated in FIG. 3, fan 51 may be disposed inside of cavity 41 defined by exhaust duct 38 but not exposed to the combustion gas. Fan 51 may be disposed axially between electric machine 46 and LP turbine disk 30. In various embodiments, fan 51 may be disposed at any suitable axial location along coupling shaft 50. In some embodiments, fan 51 may be disposed at or closer to the aft end of coupling shaft 50. For example, fan 51 may be disposed closer to electric machine 46 than to LP turbine disk 30.

When mounted to exhaust duct 38, electric machine 46 may be coaxial with LP turbine disk 30, coupling shaft 50 and low-pressure shaft 32. For example, rotor 70 of electric machine 46 may be rotatable about turbine axis TA. In other words, rotor 70 of electric machine 46, coupling shaft 50 and LP turbine disk 30 may have the same rotation axis (i.e., turbine axis TA). Since electric machine 46 may be disposed aft of LP turbine disk 30, LP turbine disk 30 may be disposed between electric machine 46 and propeller 24.

Figure 4:
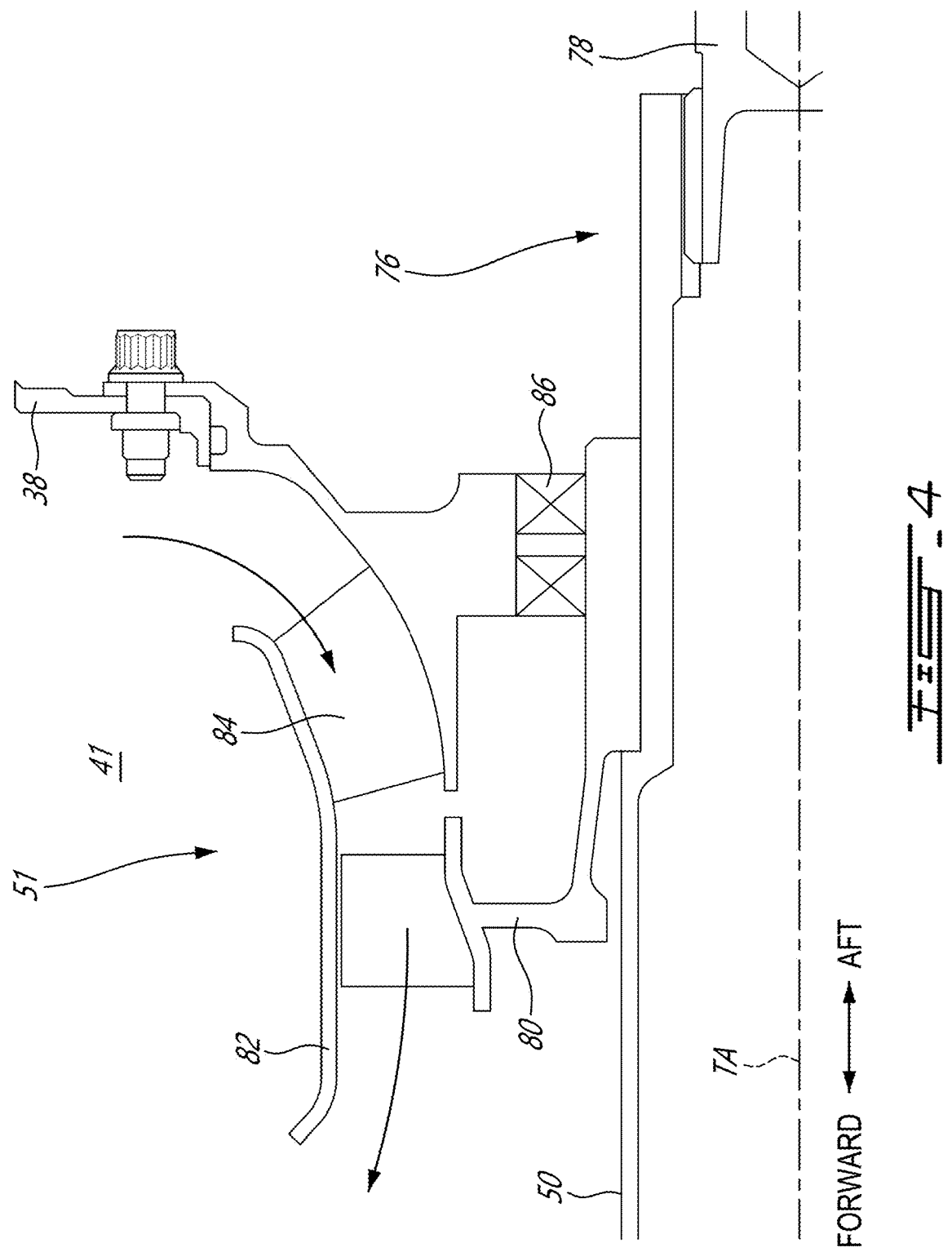
FIG. 4 is an enlarged view of a region of FIG. 3 including the fan.

FIG. 4 is an enlarged view of a region of FIG. 3 including fan 51. In some embodiments, fan 51 may be an axial or radial (e.g., centrifugal) fan operable to ventilate cavity 41 defined by exhaust duct 38. Fan 51 may include bladed rotor 80 as shown in FIG. 4 or a centrifugal impeller driven by coupling shaft 50. In some embodiments, bladed rotor 80 may be mounted for common rotation with the shaft. Bladed rotor 80 may be in torque-transmitting engagement with coupling shaft 50 via a compression fit, a splined coupling, a flanged coupling, a keyed coupling or other suitable means. Bladed rotor 80 may be rotatable about turbine axis TA. Bladed rotor 80 may be coaxial with coupling shaft 50. Bladed rotor 80 may rotate in all operating conditions of power plant 10 in which coupling shaft 50 rotates.

Bladed rotor 80 may be disposed between electric machine 46 and LP turbine disk 30. Bladed rotor 80 may be disposed closer to electric machine 46 than to LP turbine disk 30. In other words, bladed rotor 80 may be disposed in an aft portion of cavity 41. The blades of bladed rotor 80 may be oriented to propel the cooling air mainly toward the forward direction. For example, bladed rotor 80 may be configured to propel the cooling air axially forward toward LP turbine disk 30.

In some embodiments, fan 51 may include an optional stator stage including one or more stationary vanes 84 (referred hereinafter in the singular) fixedly mounted (e.g., fastened) to exhaust duct 38 and disposed inside of cavity 41. Vane 84 may interact with a flow of the cooling air upstream of bladed rotor 80 of fan 51. Vane 84 may orient the incoming flow of cooling air toward a more favorable orientation immediately upstream of bladed rotor 80. For example, vane 84 may provide desirable flow incidence for improved efficiency of fan 51.

In some embodiments, fan 51 may be shrouded and may include optional radially outer shroud 82 disposed immediately radially outward of bladed rotor 80. Shroud 82 may assist with guiding the cooling air along the desired direction.

In some embodiments, coupling shaft 50 may be rotatably supported by exhaust duct 38 via one or more aft bearings 86 supporting an aft portion of coupling shaft 50.

Figure 5:
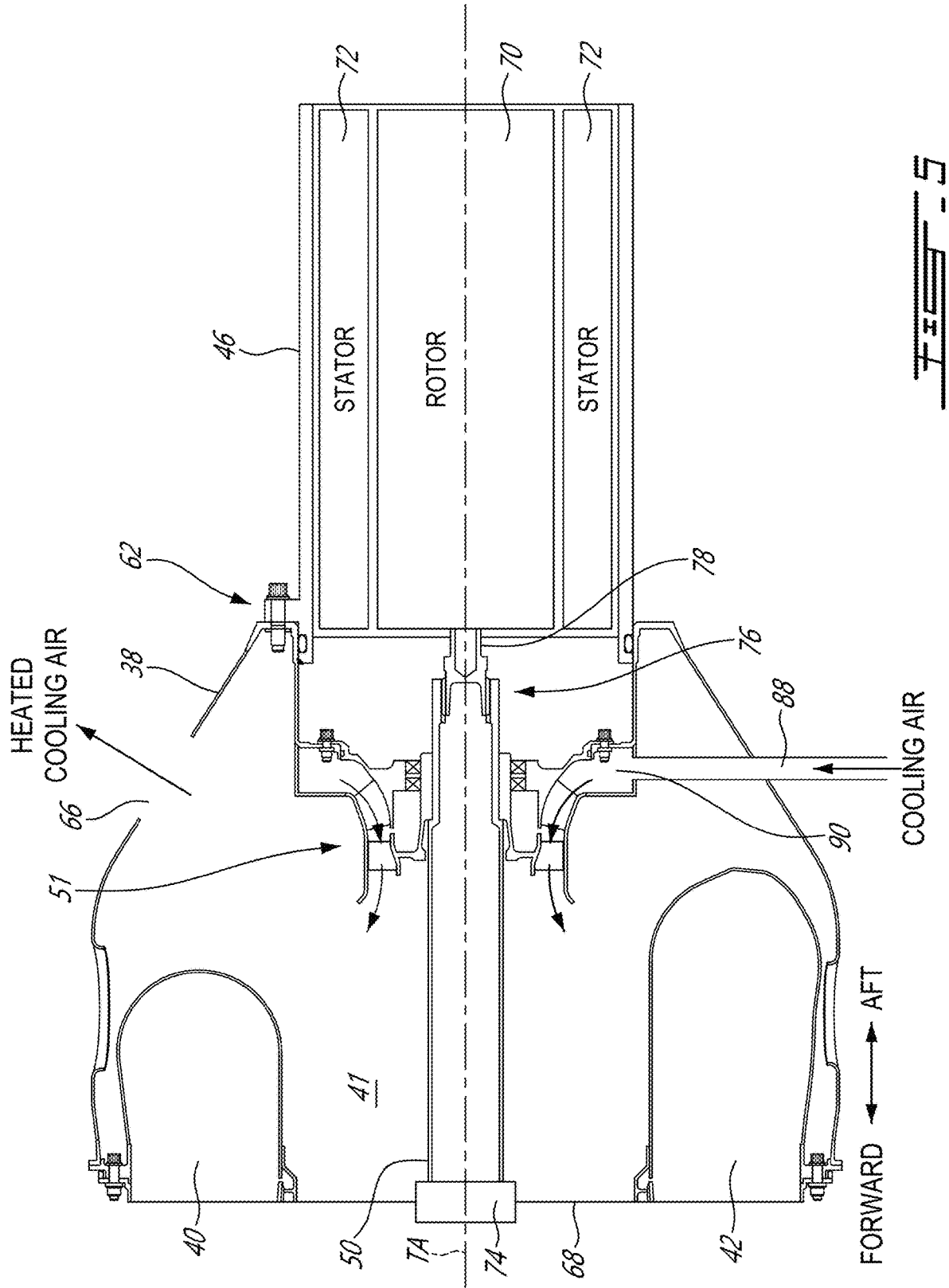
FIG. 5 is a cross-sectional view of the aft portion of the hybrid aircraft power plant of FIG. 2 taken along line 3-3 in FIG. 2 showing another means of supplying cooling air to the fan of FIG. 3.

FIG. 5 is cross-sectional view of the aft portion of the hybrid aircraft power plant of FIG. 2 taken along line 3-3 in FIG. 2 showing another exemplary means for supplying fan 51 with cooling air. In some embodiments, the cooling air may be supplied to an inlet of fan 51 via one or more pipes 88 that extend through a wall of exhaust duct 38. A plurality of pipes 88 may be circumferentially distributed around turbine axis TA. Alternatively, a single pipe 88 may deliver the cooling air to fan 51. For example, pipe(s) 88 may deliver the cooling air to fan 51 via inlet scroll 90. Fan 51 may propel the cooling air into cavity 41 and, after collecting heat, the cooling air may exit cavity 41 via one or more openings 66. The heated cooling air may be released into space 45 inside of nacelle 44. Alternatively, the heated cooling air may be released directly outside of nacelle 44.

Pipe(s) 88 may be fluidly connected to the source of cooling air. In some embodiments, the cooling air may include compressed air bled from compressor 18 of engine 14. In some embodiments, the source of cooling air may include an ambient environment outside of nacelle 44. In some embodiments, the source of cooling air may include space 45 between nacelle 44 and engine 14. In some embodiments, the cooling air may include ambient air that is bled from air inlet 16. In some embodiments the source of cooling air may include an ambient environment outside of nacelle 44.

FIG. 6 is a flow diagram of a method 1000 of propelling aircraft 12 or another aircraft. Method 1000 may be performed using power plant 10 or using another power plant 10. Method 1000 may include aspects of power plant 10. Method 1000 may include other actions disclosed herein. In various embodiments, method 1000 may include:

> extracting energy from combustion gas using a turbine (e.g., LP turbine disk 30) (block 1002);
>
> driving an air mover (e.g., propeller 24) with the turbine to propel aircraft 12 (block 1004);
>
> conveying the combustion gas from the turbine in an exhaust passage of exhaust duct 38 (block 1006);
>
> driving the air mover with an electric motor (e.g., electric machine 46) via a shaft (e.g., coupling shaft 50) drivingly connecting the electric motor to the turbine, the shaft extending inside cavity 41 of exhaust duct 38 that is fluidly isolated from the exhaust passage of exhaust duct 38 (block 1008); and
>
> driving fan 51 with the shaft to circulate cooling air inside of cavity 41 of exhaust duct 38 (block 1010).

In some embodiments, driving fan 51 may include rotating bladed rotor 80 of fan 51 together and coaxially with coupling shaft 50.

Driving the air mover with the turbine to propel aircraft 12 may include propelling aircraft 12 in a forward direction. Driving fan 51 may propel the cooling air in the forward direction inside of cavity 41 of exhaust duct 38.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A hybrid aircraft power plant comprising:

an air mover for propelling an aircraft;

a gas turbine engine operable to drive the air mover, the gas turbine engine including:

> a turbine disk operable to extract energy from an annular stream of combustion gas, the turbine disk being rotatable about a rotation axis;
>
> an exhaust duct defining: an exhaust passage disposed radially outward of the rotation axis for receiving the annular stream of the combustion gas from the turbine disk and conveying the combustion gas away from the turbine disk; and a cavity disposed radially inward of the exhaust passage;
>
> a shaft drivingly connected to the turbine disk and extending inside the cavity defined by the exhaust duct; and a fan drivingly connected to the shaft and operable to circulate cooling air inside the cavity defined by the exhaust duct; and an electric machine drivingly connected to the turbine disk via the shaft and operable as a motor to drive the air mover via the shaft, wherein:

the fan includes a bladed rotor driven by the shaft;

the fan is closer to the electric machine than to the turbine disk; and the blades of the bladed rotor are oriented to propel the cooling air at the fan axially toward the turbine disk.

2. The hybrid aircraft power plant as defined in claim 1, wherein:

a rotor of the electric machine is coaxial with the turbine disk;

the shaft is coaxial with the turbine disk; and the turbine disk is disposed between the electric machine and the air mover.

3. The hybrid aircraft power plant as defined in claim 2, wherein the fan is disposed inside of the cavity defined by the exhaust duct and between the electric machine and the turbine disk.

4. The hybrid aircraft power plant as defined in claim 2, wherein the bladed rotor is mounted for common rotation with the shaft.

5. The hybrid aircraft power plant as defined in claim 4, comprising a stator vane fixedly mounted to the exhaust duct inside of the cavity defined by the exhaust duct, for interacting with a flow of the cooling air upstream of the bladed rotor of the fan.

6. The hybrid aircraft power plant as defined in claim 2, wherein:

the electric machine is mounted to the exhaust duct; and the electric machine is disposed outside of the cavity defined by the exhaust duct.

7. The hybrid aircraft power plant as defined in claim 1, wherein the bladed rotor is mounted for common rotation with the shaft.

8. The hybrid aircraft power plant as defined in claim 1, wherein the exhaust duct defines an opening providing fluid communication between the cavity defined by the exhaust duct and a source of the cooling air.

9. The hybrid aircraft power plant as defined in claim 8, wherein:

the gas turbine engine is housed inside a nacelle; and the source of cooling air includes a space between the nacelle and the gas turbine engine.

10. The hybrid aircraft power plant as defined in claim 8, wherein:

the gas turbine engine is housed inside a nacelle; and the source of cooling air includes an ambient environment outside of the nacelle.

11. The hybrid aircraft power plant as defined in claim 8, wherein:

the gas turbine engine includes a compressor; and the source of cooling air includes the compressor of the gas turbine engine.

12. The hybrid aircraft power plant as defined in claim 1, comprising an inlet scroll operable to deliver the cooling air to the fan.

13. A hybrid aircraft power plant comprising:

a propeller for propelling the aircraft;

a compressor for pressurizing air;

a combustor in which the pressurised air is mixed with fuel and ignited for generating combustion gas;

a turbine disk for extracting energy from combustion gas, the turbine disk having a rotation axis and being in torque-transmitting engagement with the propeller;

an exhaust duct for receiving the combustion gas from the turbine disk, the exhaust duct defining: an exhaust passage disposed radially outward of the rotation axis of the turbine disk for receiving the combustion gas from the turbine disk and conveying the combustion gas away from the turbine disk; and a cavity fluidly isolated from the exhaust passage and disposed radially inward of the exhaust passage;

an electric machine in torque-transmitting engagement with the turbine disk via a shaft extending inside the cavity defined by the exhaust duct; and a fan operable to ventilate the cavity defined by the exhaust duct, the fan including a bladed rotor mounted for common rotation with the shaft and configured to propel cooling air at the fan toward the turbine disk, the fan being closer to the electric machine than to the turbine disk.

14. The hybrid aircraft power plant as defined in claim 13, wherein:

the propeller is operable to propel the aircraft in a forward direction;

the exhaust duct is disposed aft of the turbine disk; and the electric machine is disposed aft of the cavity defined by the exhaust duct.

15. The hybrid aircraft power plant as defined in claim 14, wherein:

the electric machine is coaxial with the turbine disk;

the shaft is coaxial with the turbine disk;

the turbine disk is disposed between the electric machine and the propeller; and the bladed rotor of the fan is disposed between the electric machine and the turbine disk.

16. A method of propelling an aircraft, the method comprising:

extracting energy from combustion gas using a turbine;

driving an air mover with the turbine to propel the aircraft;

conveying the combustion gas from the turbine in an exhaust passage of an exhaust duct;

driving the air mover with an electric motor via a shaft drivingly connecting the electric motor to the turbine, the shaft extending inside a cavity of the exhaust duct that is fluidly isolated from the exhaust passage of the exhaust duct; and driving a fan with the shaft to circulate cooling air inside of the cavity of the exhaust duct, wherein:

driving the air mover with the turbine to propel the aircraft includes propelling the aircraft in a forward direction;

driving the fan includes propelling the cooling air at the fan in the forward direction inside of the cavity of the exhaust duct; and the fan is closer to the electric motor than to the turbine.

17. The method as defined in claim 16, wherein driving the fan includes rotating a bladed rotor of the fan together and coaxially with the shaft.

* * * * *